United States Patent
Nashimoto et al.

(10) Patent No.: US 7,526,176 B2
(45) Date of Patent: Apr. 28, 2009

(54) OPTICAL AMPLIFIER AND FABRICATION METHOD THEREOF

(75) Inventors: Keiichi Nashimoto, Ayase (JP); Yoshiyuki Sugahara, Tokyo (JP)

(73) Assignee: EpiPhotonics Corp., Kanagawa (JP)

( * ) Notice: Subject to any disclaimer, the term of this patent is extended or adjusted under 35 U.S.C. 154(b) by 0 days.

(21) Appl. No.: 11/726,711

(22) Filed: Mar. 22, 2007

(65) Prior Publication Data

US 2007/0237483 A1    Oct. 11, 2007

(30) Foreign Application Priority Data

Mar. 23, 2006    (JP) .............................. 2006-081783

(51) Int. Cl.
    *G02B 6/00*    (2006.01)
(52) U.S. Cl. ...................... 385/141; 385/142; 385/143; 385/144
(58) Field of Classification Search ......... 385/141–143, 385/144
    See application file for complete search history.

(56) References Cited

U.S. PATENT DOCUMENTS

| 5,852,703 | A | * | 12/1998 | Nashimoto | ................. 385/130 |
| 6,862,393 | B2 | * | 3/2005 | Nashimoto | ................. 385/129 |
| 2007/0161134 | A1 | * | 7/2007 | Lin et al. | ...................... 438/22 |

OTHER PUBLICATIONS

Musa, et al., "Characteristics of Er-Doped $Al_2O_3$ Thin Films Deposited by Reactive Co-Sputtering", IEEE Journal of Quantum Electronics, vol. 36, No. 9, Sep. 2000, pp. 1089-1097.
Ballato, et al., "Phonon Sideband Spectroscopy and 1550 nm Luminescence from Eu3+ and Er3+-doped Ferroelectric PLZT for Active Electro-Optic Applications", Journal of Luminescence, 86 (2000), pp. 101-105.

* cited by examiner

*Primary Examiner*—Jennifer Doan
(74) *Attorney, Agent, or Firm*—Knobbe Martens Olson & Bear LLP

(57) ABSTRACT

An optical amplifier including an optical waveguide layer (for example channel-shaped optical waveguide layer) including $Pb_{1-x}La_x(Zr_yTi_{1-y})_{1-x/4}O_3$ (PLZT: $0<x<0.3$, $0<y<1.0$) doped with a rare earth element at an amount of 0.2 mol % to 11.0 mol %, the optical waveguide layer (for example channel-shaped optical waveguide layer) being formed as a single crystal film by solid-phase epitaxial growth.

9 Claims, 16 Drawing Sheets

OPTICAL AMPLIFIER AND FABRICATION METHOD THEREOF

CROSS-REFERENCE TO RELATED APPLICATIONS

This application claims priority under 35 U.S.C 119 from Japanese Patent Application No. 2006-081783, the disclosure of which is incorporated by reference herein.

BACKGROUND OF THE INVENTION

1. Technical Field

The present invention relates to an optical function device using a PLZT waveguide, for example, a waveguide type optical amplifier that has an amplifying function that amplifies light transmitted by optical fiber without optical-electric conversion, and a fabrication method thereof.

2. Description of the Related Art

In optical communications networks, efforts are continuing to develop, from point to point optical communication connecting individual inter-nodes, optical communication carrying out Add-Drop Multiplexing between points, and also optical communication connecting plural inter-nodes just with an optical signal, without converting to an electrical signal. Also, since volumes of traffic and functionality of optical communications networks are increasing, multiplexing of plural wavelengths in a single strand of optical fiber, and, the opposite thereof, of dividing optical signals of plural wavelengths being transmitted in a single strand of optical fiber into their individual wavelengths (WDM: Wavelength Division Multiplexing), have been put into practice.

In these methods, it is necessary to transmit optical signals with different wavelengths from each other in a single strand of optical fiber, and to carry out intermediate relay amplifying according to the transmitting distance without converting into electrical signals. Optical amplifiers, for carrying out long haul transmissions without conversion from optical into electrical signals, support optical networks.

As optical amplifiers, optical fiber amplifiers with optical amplification media of optical fibers in which a rare earth element has been added to the core, for example Er (erbium) Doped Optical Fiber Amplifiers (EDFA), have been put into practice, and application of such amplifiers to optical communications is continuing to progress at a fast pace. Such EDFAs are operated in the 1.55 µm wavelength band where the loss in silicon optical fibers is at a minimum, and are known for their superior characteristics of high gain of 30 dB or more, low noise, wide gain band, lack of polarization dependence in the gain, high saturation power output, and the like.

However, EDFAs are optical fibers of around 10 m in length, and have the problem that it is difficult to make the devices themselves small. Therefore, for the future, effort is being put into optical amplifiers which include laser light sources for excitation, miniaturization of optical amplifiers, and also into integration and standardization of plural optical amplifier units, and modulization of high-specification devices with modulators, switches, wavedividers and the like integrated onto a single substrate to reduce the size, with development progressing in optical amplifiers in waveguide form using, optical waveguides, materials with rare earth elements added that can be used as amplification media at the desired wavelength band.

An optical switch is one of the most important components, and is a component that, for example, is used for switching between plural optical fibers according to demand, and used for switching to secure a diversion route when there is damage to a network. Optical waveguide switches that are superior in being miniaturized are generally formed as channel optical waveguides in $LiNbO_3$, semiconductor compounds, quartz, or polymers, and are provided with an optical switch for electrically controlling the light progress direction at the intersection portions of each of the paths, or with an optical gate for electrically controlling, open or close, the progress of the light.

Optical switches using quartz or a polymer, are made with a core size that is about the same size as the mode field diameter, and have the characteristic that the insertion loss is low because the optical coupling efficiency from the optical fiber is good. However, there is the problem that, by running current through a heater provided on the surface of the optical waveguide, in order to change the direction of light progression using a change in refractive index due to the thermo-optical effect, the reaction time of such optical switches is slow. Furthermore, in order to use such a heating method with a heater, several hundreds of mW of power is consumed for the single electrode, and there is the problem that fields of use are limited.

Other than these, there are optical waveguide optical switches that use organic nonlinear optical materials. By a structure of an optical waveguide of a field poled polymer or the like, sandwiched between upper and lower electrodes, an optical switch that can be driven at a low voltage can be configured, but field poled polymers have the problem of temperature stability when compared to ferroelectric oxide materials, and, in reality, are not readily applicable.

In the case of optical waveguide optical switches using compound semiconductors and quantum wells, increasing speeds is possible, and there is the expectation of reducing the driving voltage since voltage can be applied above and below the optical waveguide core. However, there is the problem that the insertion loss is high because the optical coupling efficiency from the optical fiber is poor due to the small core size, and effort is being put into various areas. As well as this, there is the problem that the switching characteristics are inferior due to the occurrence of light absorption when switching by applying an electric field, and there are problems such as, since wafer size is limited, it is difficult to configure large scale matrixes of optical switches.

The most typically used materials for optical switches are ferroelectric oxide materials, and in the case of one of them, $LiNbO_3$, if voltage is applied to electrodes of an optical switch then, due to the electro-optical effect, there is a change in the refractive index, and by this the conditions of the light can be changed at high speed, and depending on the set conditions, the progression direction of the light is changed. Because of this, in an optical switch it is possible to selectively output light that entered from two input terminals to two respective output terminals. Optical switches using $LiNbO_3$ may be produced by making a waveguide on a single crystal wafer by diffusion of Ti or proton exchange, and the core size can be made to be about the same as the optical fiber mode diameter, therefore, since the optical coupling efficiency is good, insertion loss is small, and workable optical switches are known.

However, since it is a configuration in which coplanar electrodes are disposed on the optical waveguide faces and voltage is applied, when the distance between electrodes becomes large and the field profile also does not become optimal, and in order to have no polarization depencence present the driving voltage becomes high, at 40 volts, and so that the driving voltage does not become even more extremely high, usually a long electrode of 7 mm or more is required.

Further, in order to make a waveguide to a single crystal wafer by diffusion of Ti or proton exchange, it is not possible to make the effective refractive index of the channel optical waveguide high enough compared to the refractive index of the surroundings, and not possible to make the difference in refractive index high. Due to this, the need arises to make the radius of curvature of the channel optical waveguide as big as 50 mm, and, in the example of an 8×8 optical switch matrix, the size of becomes about 70 mm.

As above, whichever of $LiNbO_3$, compound semiconductors, quartz or polymers are used, it is not possible to obtain an optical waveguide matrix optical switch which satisfies at the same time all of the characteristics of optical switch size, driving voltage (or driving current or power consumption), switching speed, cross-talk, insertion loss, and temperature stability.

As a material for solving these problems, PLZT, that is $Pb_{1-x}La_x(Zr_yTi_{1-y})_{1-x/4}O_3$ (PLZT: $0<x<0.3$, $0<y<1.0$), is attracting attention for optical waveguides, and optical switches are in the process of being developed with high speed, low driving voltage, low power consumption, small size.

However, regarding PLZT ceramics, there is information about investigations into the photoluminescence characteristics thereof, according to Ballato et al. (J. Luminescence, 86 (2000) p.p. 101-105), but this does not include investigations into PLZT waveguide optical amplifiers. Therefore, the appropriate doping amounts and doping methods relating to rare earth element-doping were not known, and configuring an optical amplifier was difficult.

That is to say, with the aim of raising the amplification efficiency and making optical amplifiers of smaller size, or increasing the width of the amplification wavelength band, it is necessary to increase the concentration of rare earth ions, for example $Er^{3+}$ ions added per unit volume, but generally, when the concentration is increased, a condition occurs in which multiple $Er^{3+}$ ions exist in clusters, and this is an impediment to increasing the amplification efficiency.

Therefore, for investigations into the optical amplifiers with PLZT waveguides as the medium, raising the amplification efficiency and also increasing the width of the amplification wavelength band, when increasing the concentration of rare earth ions, for example $Er^{3+}$ ions, added into a PLZT waveguide layer (core layer), it is necessary to consider the optimum concentration that can suppress clusterization of the added $Er^{3+}$ ions, and also to consider methods of forming an Er-doped PLZT film optical waveguide. In quartz and $Al_2O_3$ waveguides, it is possible to form an optical amplifier component using film forming methods such as chemical vapor deposition (CVD) methods, flame hydrolysis deposition (FHD) methods, sputtering methods, vapor deposition methods, and the like, and adding a rare earth to the raw material gases, sputtering targets, or vapor sources.

However, if the rare earth is added at a certain concentration or above, in whichever of the film forming methods, defects develop such as precipitation out, and the addition amount of the rare earth species becomes about 1 mol %. For example, in the Er-doped $Al_2O_3$ waveguide optical amplifier formed by sputtering and reported by Musa et al. (IEEE J. Quantum Electronics, Vol. 36, No. 9 (2000) p.p. 1089-1097) doping was carried out up to a concentration of 0.74 mol %, and a net gain of 1.0 dB/cm was reported. However, since a concentration of such a level is not able to obtain sufficient optical amplifying efficiency, waveguides for optical amplifier use must be elongated.

Furthermore, when investigating PLZT waveguide optical amplifiers, it is necessary to achieve a state of containment of more of the internally amplified light within the optical waveguide layer (core layer), and also necessary to reduce the overall loss. Specifically, it is necessary to achieve conditions of the waveguide in which a predetermined difference in refractive index between the core and the surrounding cladding is achieved.

There is a need for an optical amplifier including a PLZT optical waveguide layer with added rare earth element, the optical amplifier being one of small size and high efficiency, and a fabrication method for the same is also needed.

SUMMARY

According to an aspect of the invention, there is provided an optical amplifier comprising an optical waveguide layer comprising $Pb_{1-x}La_x(Zr_yTi_{1-y})_{1-x/4}O_3$ (PLZT: $0<x<0.3$, $0<y<1.0$) doped with a rare earth element at an amount of 0.2 mol % to 11.0 mol %, the optical waveguide layer being formed as a single crystal film by solid-phase epitaxial growth.

According to another aspect of the invention, there is provided a fabrication method for the optical amplifier of an aspect of the invention, the optical amplifier fabrication method comprising:

forming on a substrate an amorphous film as an optical waveguide layer precursor; and heating the amorphous film to crystallize the film to form the optical waveguide layer by solid-phase epitaxial growth.

DETAILED DESCRIPTION OF THE INVENTION

Figure 1:
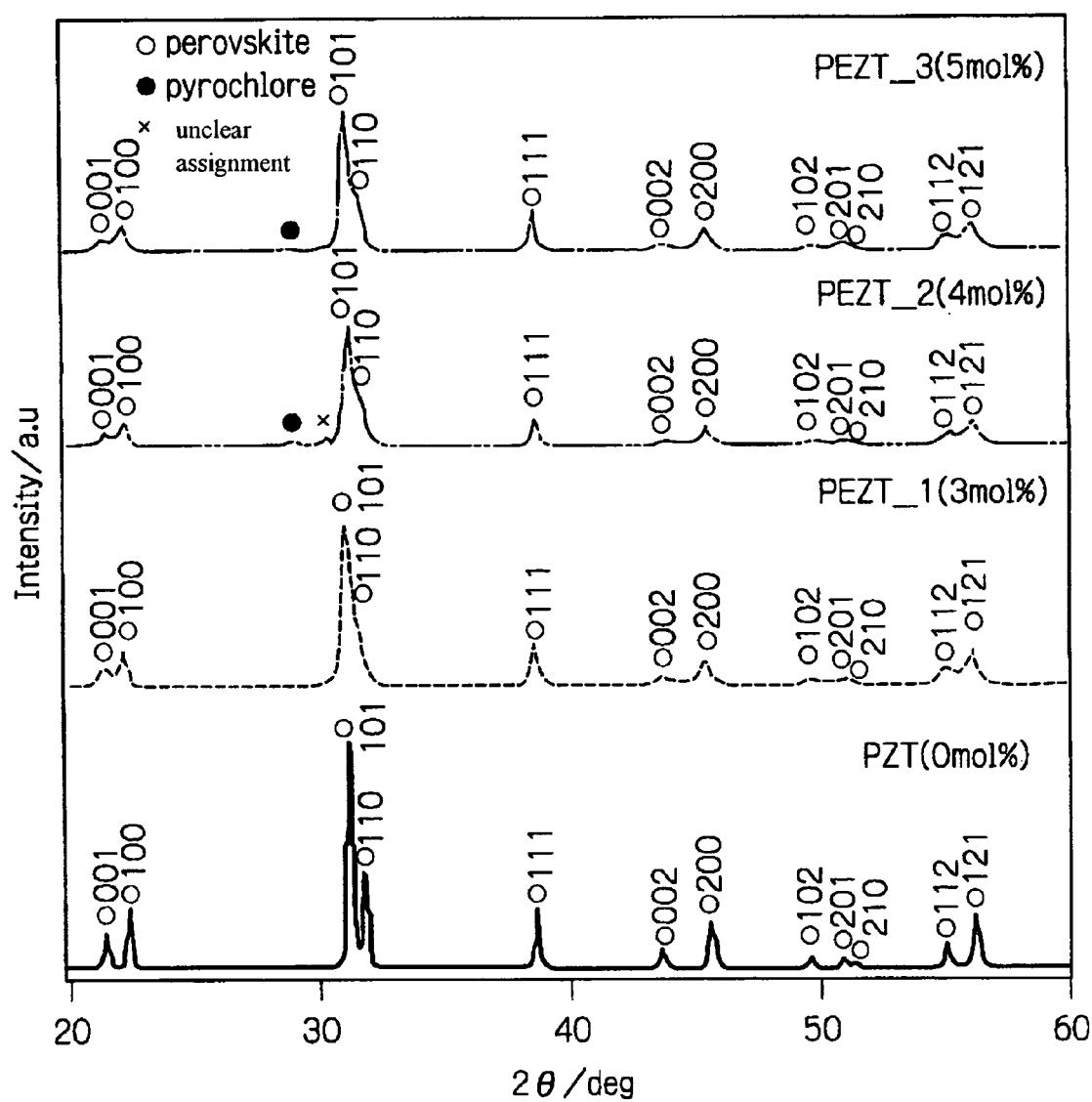
FIG. 1 is a diagram showing X-ray diffraction patterns of Er-doped PLZT powders.

The optical amplifier of the present invention is an optical amplifier including an optical waveguide layer including $Pb_{1-x}La_x(Zr_yTi_{1-y})_{1-x/4}O_3$(PLZT: 0<x<0.3, 0<y<1.0) doped with a rare earth element at an amount of 0.2 mol % to 11.0 mol %, the optical waveguide layer being formed as a single crystal film by solid-phase epitaxial growth.

In the optical amplifier of the present invention, Er (erbium) is most preferable for the rare earth element.

The optical amplifier of the present invention may include, in addition to the optical waveguide layer, a buffer layer and a cladding layer, and the PLZT compositions of the optical waveguide layer, the buffer layer and the cladding layer, may be configured to be different from each other.

In the optical amplifier of the present invention, the optical waveguide layer may have a channel-shaped optical waveguide layer.

The optical amplifier fabrication method of the present invention is a fabrication method for fabricating the above optical amplifier, and the method includes forming an amorphous film as an optical waveguide layer precursor, and heating the amorphous film to form an optical waveguide layer by solid-phase epitaxial growth.

The optical amplifier fabrication method of the present invention may further include carrying out etching of at least a portion of either the amorphous film or the optical waveguide layer to form a channel-shaped optical waveguide layer.

In the optical amplifier fabrication method of the present invention the forming of the amorphous layer may include coating an optical waveguide layer precursor coating solution on the substrate and forming an amorphous film by heating.

Details of the present invention will be explained below.

The optical amplifier of the present invention includes an optical waveguide layer including $Pb_{1-x}La_x(Zr_yTi_{1-y})_{1-x/4}O_3$ (PLZT: 0<x<0.3, 0<y<1.0) that is doped with a rare earth element at an amount of 0.2 mol % to 11.0 mol % (preferably 0.2 mol % to 7 mol %, and more preferably 0.2 mol % to 3.0 mol %), the optical waveguide layer being formed as a single crystal film by solid-phase epitaxial growth. By such a configuration, the optical amplifier of the present invention is a small size and high efficiency optical amplifier. The optical amplifier of the present invention is based on the following findings.

The inventors of the present invention diligently investigated sputtering, MOCVD, and solution methods related to doping PLZT with rare earth elements (for example Er and the like). Out of these, by forming one composite PLZT of a PLZT powder formed by using, for example, a superior solution method of dispersing metal ions in an organometallic compound solution to uniformity at the molecular level, and crystallizing while maintaining such a state, and comparing such a PLZT powder with a single crystal film formed by solid-phase epitaxial growth, the inventors made new insights relating to the differences between PLZT powder and PLZT solid-phase epitaxial single crystal films, and doping amounts. By, furthermore, trial production of PLZT optical waveguide type optical amplifiers, the inventors arrived at the present invention.

That is, by fabricating PLZT powder and PLZT solid-phase epitaxial single crystal films using the following solution method, the differences therebetween and the doping amounts were investigated and the insights below were discovered.

First, for example, 2-methoxyethanol ($CH_3OCH_2CH_2OH$: MOE) was added to $Pb(CH_3COO)_2$, and an alcohol exchange reaction was carried out by reflux heating. Then vacuum distillation was carried out, and removal of byproduct 2-methoxyethyl acetate was promoted. Next, an MOE solution of $Zr(O-i-C_3H_7)_4$, $Ti(O-i-C_3H_7)_4$, and $Er(O-i-C_3H_7)_3$ was added, and an alcohol exchange reaction was carried out by reflux heating. Then vacuum distillation was carried out, and removal of byproduct 2-methoxyethyl acetate was promoted. A precursor solution was prepared by solvent elimination from the obtained product, re-adding MOE and adjusting the precursor concentration.

The obtained precursor solution was moved to an alumina boat, and the precursor solution was introduced into a ring-furnace at the desired temperature, and by maintaining this condition thermal decomposition and crystallization was carried out, and Er-doped PLZT powder was obtained. In contrast, an Er-doped PLZT solid-phase epitaxial single crystal film was obtained by spin coating the obtained precursor solution onto a $SrTiO_3$ (100) substrate, then, after amorphizing in a RTA (Rapid Thermal Annealing) furnace, carrying out solid-phase epitaxial growth.

Figure 2:
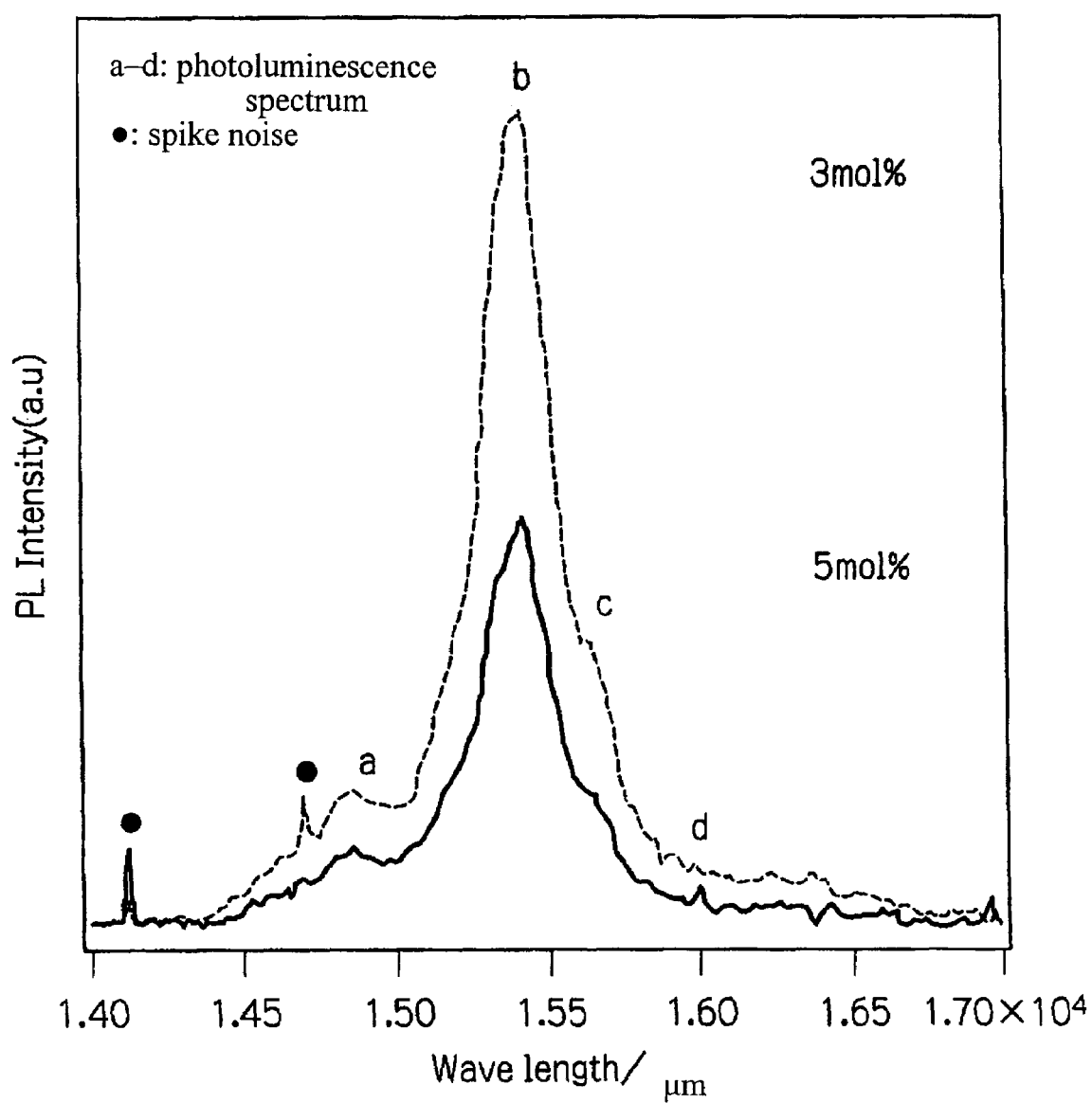
FIG. 2 is a diagram showing photoluminescence patterns for Er-doping amounts for an Er-doped PLZT powder.

First, it was found that in the Er-doped PLZT powder, as seen in the X-ray diffraction patterns of FIG. 1, when the doping amount of Er (additive amount) was 4 mol % or above, a crystalline phase that did not generated an electro-optic effect, called a pyrochlore, arose. Also, when photoluminescence was measured for an Er-doped PLZT powder, as seen in the photoluminescence spectra in FIG. 2, Er at 3 mol % had a stronger photoluminescence intensity than Er at 5 mol %. Therefore, it was discovered that, with Er-doped PLZT powder, Er-doping can only be carried out up to about the 3 mol % level.

Figure 3:
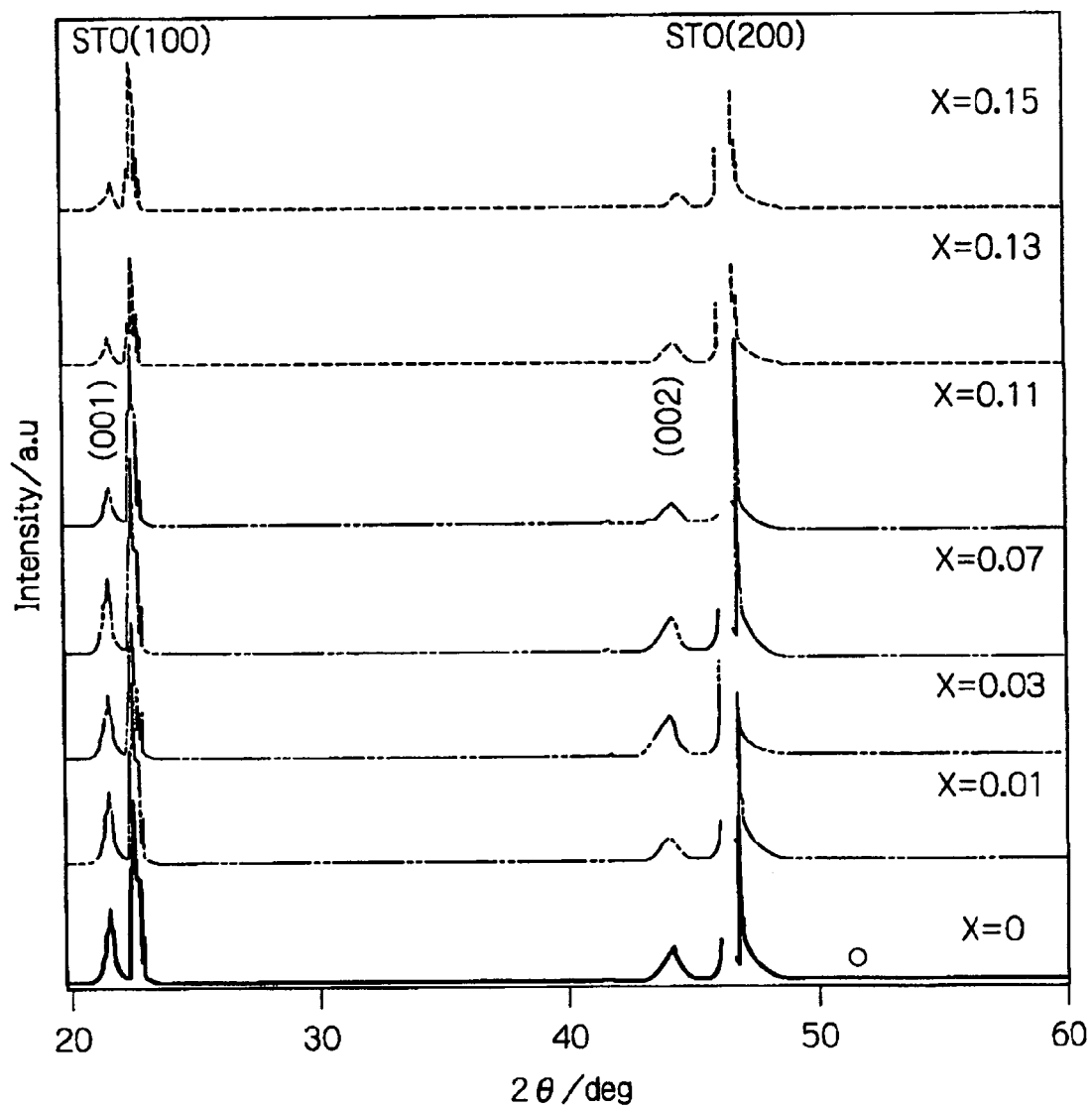
FIG. 3 is a diagram showing X-ray diffraction patterns of Er-doped PLZT epitaxial films.
Figure 4:
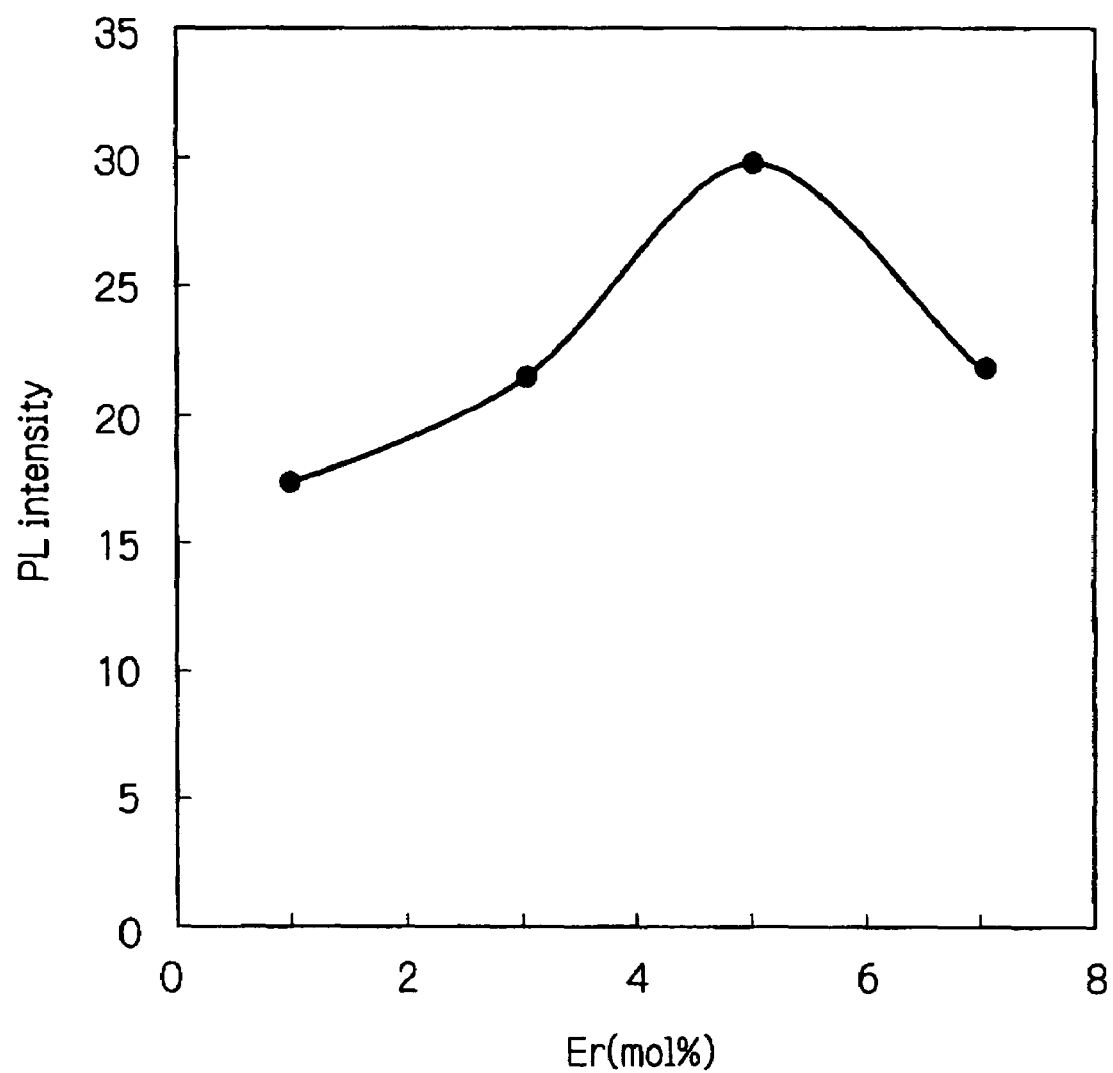
FIG. 4 is a diagram showing the photoluminescence pattern for Er-doping amounts in Er-doped PLZT epitaxial films.

In contrast, in an Er-doped PLZT solid-phase epitaxial single crystal film, as seen in the X-ray diffraction patterns in FIG. 3, with the doping amount of Er (addition amount x), up until, for example, the 13 mol % level, there is no occurrence of a precipitation phase or pyrochlores, and it is seen that significantly higher Er-doping concentration levels are possible compared to conventional film forming methods and the above PLZT powder. Furthermore, when photoluminescence measurement was carried out for an Er-doped PLZT solid-phase epitaxial single crystal film at the wavelength of 1.55 µm it was found that, as shown in the photoluminescence pattern of FIG. 4, the intensity of photoluminescence has a trend towards a maximum at around the Er 5 mol % level, with a strong intensity also at Er 7 mol %, showing that a significantly higher concentration of Er-doping is possible compared to PLZT powder.

Figure 5:
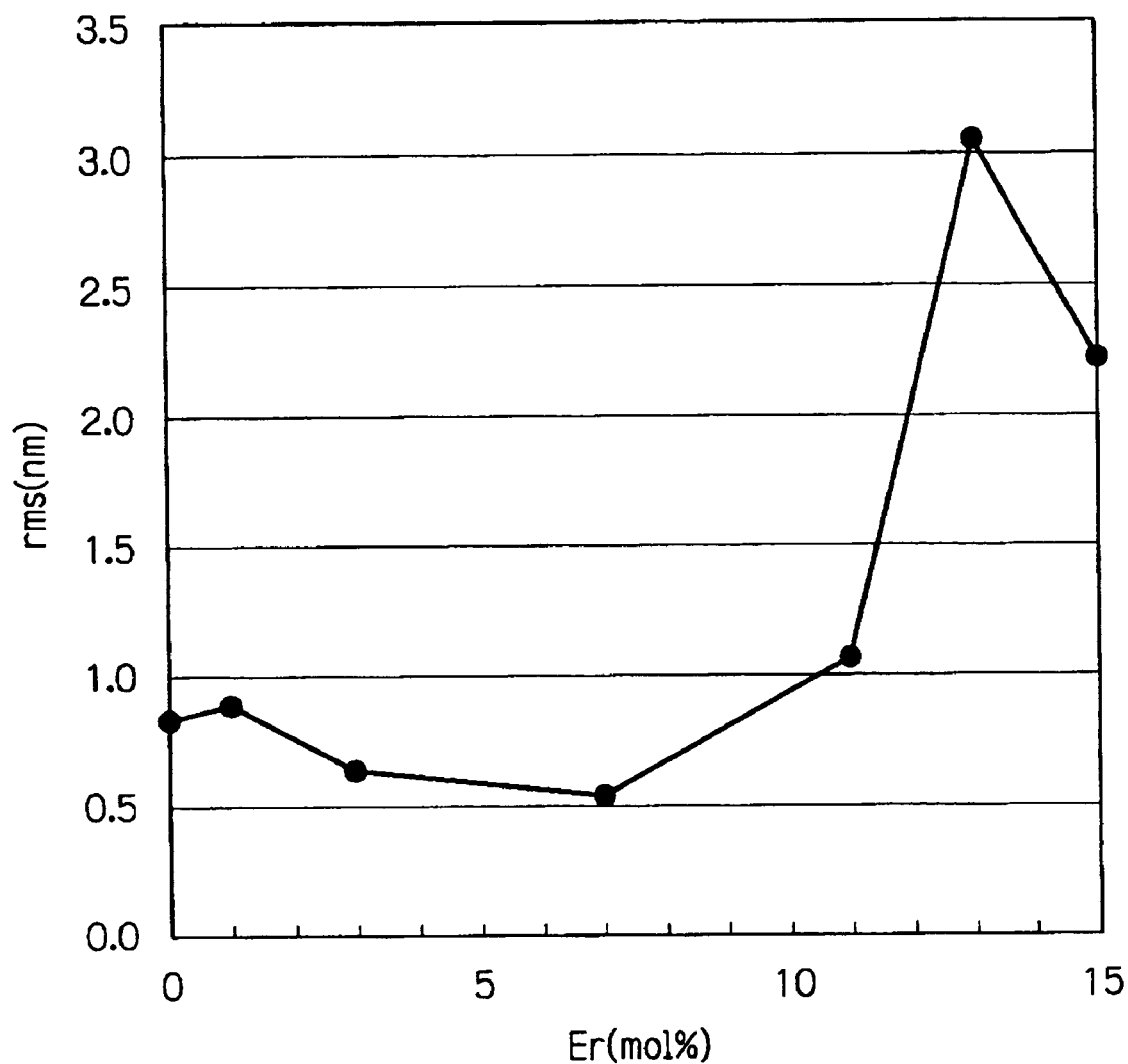
FIG. 5 is a diagram showing the root mean square surface roughness for Er-doping amounts in Er-doped PLZT epitaxial films.

First, if the surface of an Er-doped PLZT solid-phase epitaxial single crystal film is examined with an atomic force microscope, it can be seen that, as shown in FIG. 5, the surface roughness at 13 mol % and above becomes very high, and, even if formed into an optical waveguide layer, scattering loss due to the surface roughness is high and so would not be suitable as an optical waveguide layer. Therefore, it can be seen that in practice, for an optical amplifier of a PLZT optical waveguide, the upper limit for the doping amount of rare earth element is 11 mol % or below, and more preferably 7 mol % or below.

Figure 6:
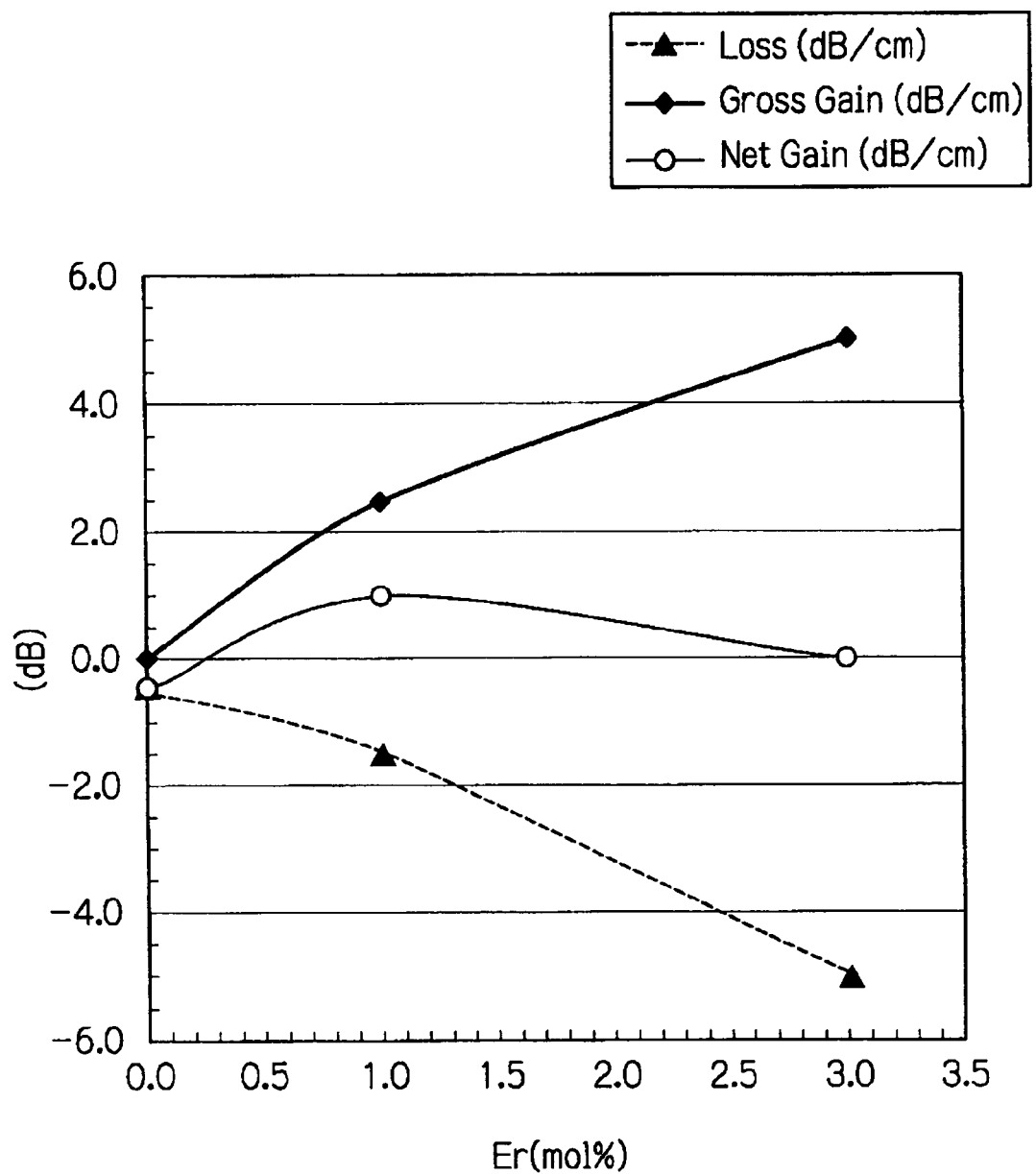
FIG. 6 is a diagram showing the optical loss and optical gain (gross gain, net gain) for Er-doping amounts in Er-doped PLZT epitaxial films.
Figure 7:
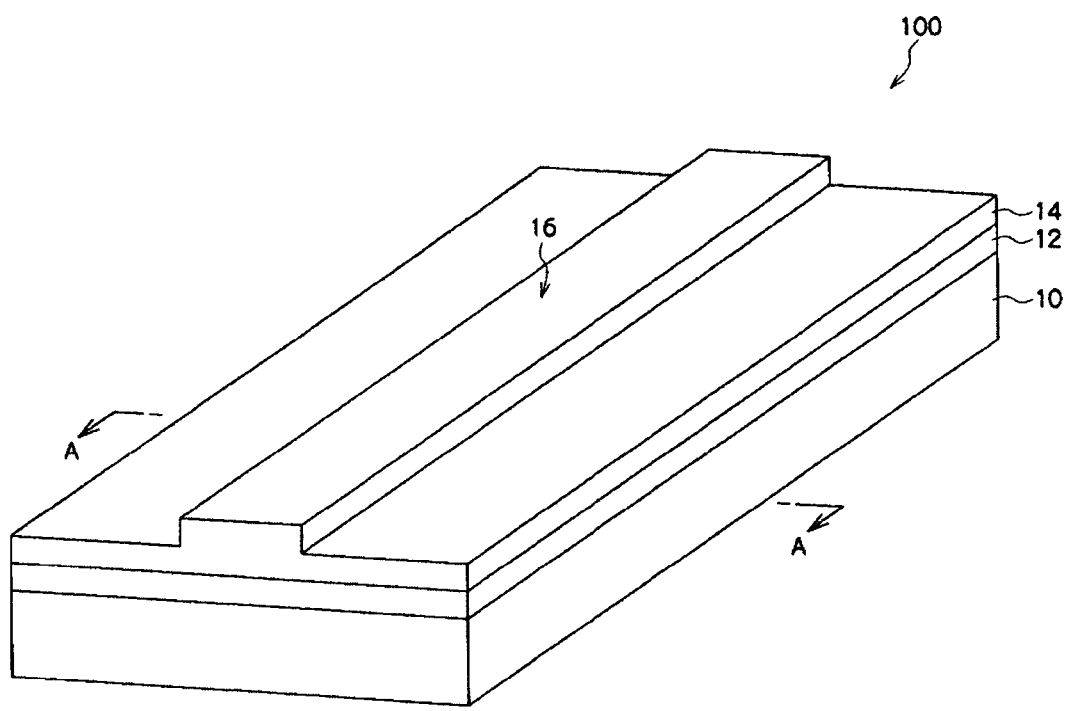
FIG. 7 is an outline perspective view of an example of an optical amplifier according to the present invention.
Figure 8:
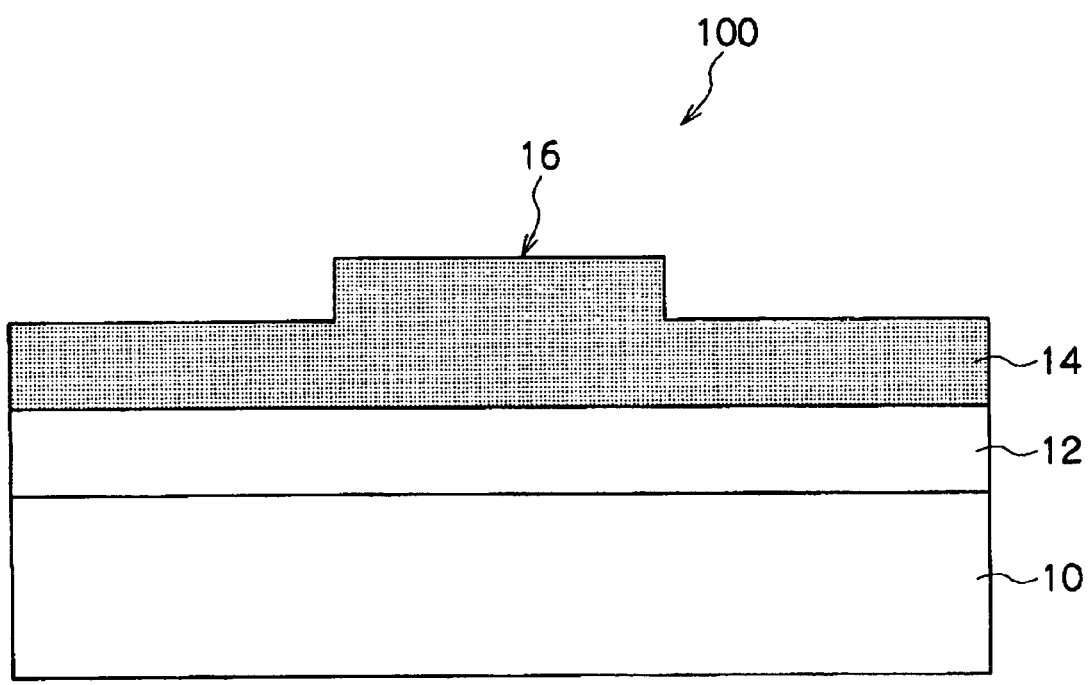
FIG. 8 is a cross-sectional diagram taken on A-A in FIG. 7.
Figure 10:
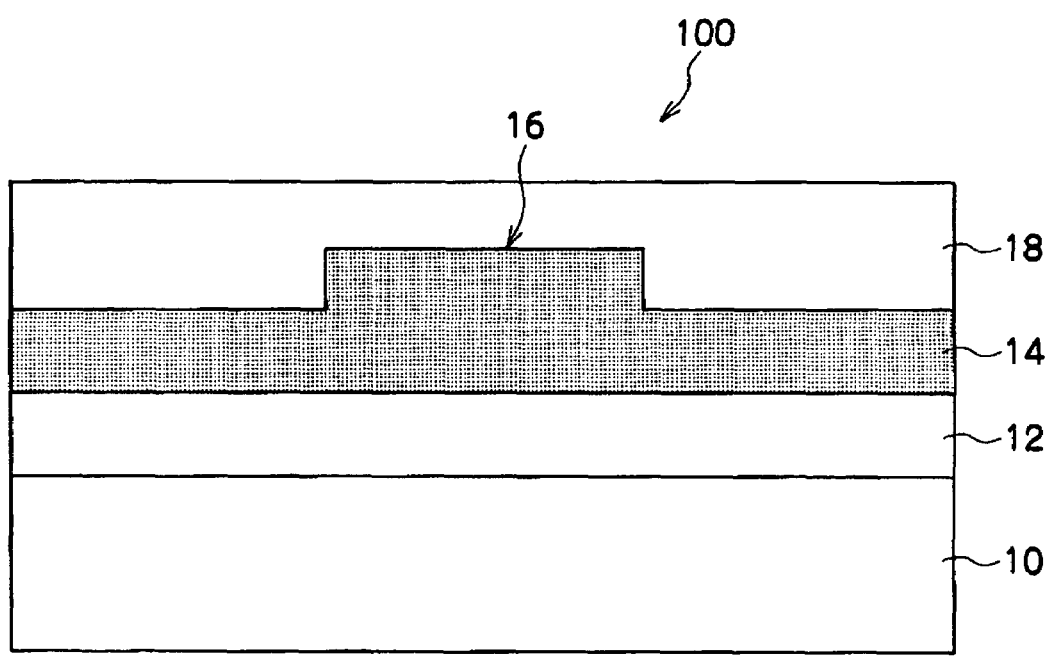
FIG. 10 is a cross-sectional diagram taken on B-B in FIG. 9.

Also, an optical amplifier 100, with a rib channel-shaped optical waveguide layer as shown in FIG. 7 and FIG. 8, was produced in the following manner. In FIG. 7 and FIGS. 8, 10 is the substrate, 12 is the buffer layer, 14 is the slab optical waveguide layer and 16 is the channel-shaped optical waveguide layer. First, a 2.3 µm film thickness epitaxial PLZT buffer layer 12 was grown on a $SrTiO_3$ substrate 10, then a 2.3 µm thick epitaxial Er-doped PZT slab optical waveguide layer 14 was solid-phase epitaxially grown in the same way as above. Then ICP etching was carried out on the Er-doped PZT slab optical waveguide layer 14 to a depth of 1.0 μm, and a width of 2.8 μm, and a straight line rib channel-shaped optical waveguide layer 16 was formed. A laser beam having a wavelength of 1.55 μm as a signal beam and a laser beam having a wavelength of 1.48 μm as a pump beam were introduced into the channel-shaped optical waveguide layer 16, and in response to pump beam power the 1.55 μm signal beam intensity was measured. The results for respective Er-doping amounts are shown in FIG. 6. As can be seen from FIG. 6, the gross gain for a pump beam power of 60 mW increases with an increase in the Er-doping amount, and at an Er-doping amount of 3.0 mol % there is an extremely high efficiency of 5 dB/cm. However, the waveguide loss also increases with an increase in the Er-doping amount, and the maximum value of the net gain, which is obtained by subtracting the waveguide loss from the gross gain, is obtained at around the Er-doping 1 mol % level, with a net gain obtained in the range of Er-doping amount of from 0.2 mol % to 3.0 mol %.

From the above knowledge, it can be seen that the optical amplifier of the present invention is a small scale high efficiency optical amplifier.

Explanation of the details of the optical amplifier according to the present invention and the fabrication method thereof will be given below.

The optical amplifier of the present invention is configured, for example, with a buffer layer, an optical waveguide layer, and a cladding layer formed in that order on a substrate. However, by combinations and the like with substrates, the configuration may be one of a buffer layer and an optical waveguide layer, an optical waveguide layer and a cladding layer, or even an optical waveguide layer on its own.

Explanation will first be given of the substrate. Appropriately used substrates include, for example: insulating, conductive, or semiconductive single crystal substrates; or substrates of an epitaxial, or single orientation, conductive or semiconductive film provided on an insulating substrate.

As a conductive or semi-conductive substrate material the following may be used: $SrTiO_3$ doped with Nb, La or the like; oxides such as Al doped ZnO, $In_2O_3$, $RuO_2$, $BaPbO_3$, $SrRuO_3$, $YBa_2Cu_3O_{7-x}$, $SrVO_3$, $LaNiO_3$, $La_{0.5}Sr_{0.5}CoO_3$, $ZnGa_2O_4$, $CdGa_2O_4$, $Mg_2TiO_4$, $MgTi_2O_4$, and the like; elemental semi-conductors such as Si, Ge, diamond and the like; Group III-V compound semi-conductors such as AlAs, AlSb, AlP, GaAs, GaSb, InP, InAs, InSb, AlGaP, AlLnP, AlGaAs, AlInAs, AlAsSb, GaInAs, GaInSb, GaAsSb, InAsSb and the like; Group II-VI compound semiconductors such as ZnS, ZnSe, ZnTe, CaSe, CdTe, HgSe, HgTe, CdS and the like; and metals such as Pd, Pt, Al, Au, Ag and the like.

When providing an epitaxial, or single orientation, conductive or semi-conductive film onto an insulating substrate surface, or when using an insulating substrate, materials that may be used for the insulating substrate include oxides such as $SrTiO_3$, $BaTiO_3$, $BaZrO_3$, $LaAlO_3$, $ZrO_2$, $Y_2O_3$ 8%-$ZrO_2$, MgO, $MgAl_2O_4$, $LiNbO_3$, $LiTaO_3$, $Al_2O_3$, ZnO and the like. Examples of materials which may be used for a conductive or semi-conductive film, are the same sorts of materials as the above conductive or semi-conductive substrate materials, and these materials may be used to form an epitaxial, or single orientation, conductive or semi-conductive film.

Next, the optical waveguide will be explained. For the optical waveguide layer, a rare earth-doped PLZT single crystal film is used, formed as above by solid-phase epitaxial growth. Here, for $Pb_{1-x}La_x(Zr_yTi_{1-y})_{1-x/4}O_3$ (0<x<0.3, 0<y<1.0), depending on the values of x and y, all of PT, PZT, PLT, PLZT are referred to with the general expression "PLZT".

For the rare earth element for doping, Er, Nd, Tm, Yb, Ho, Pr and the like may be used, but particularly preferable is Er.

The film thickness of the optical waveguide layer may be set, for example, between 0.1 μm and 10 μm, however, the thickness may be suitably selected according to the purpose.

The optical waveguide layer may be any type of the generally used embedded, ridge, or rib types, in other words an optical waveguide layer having a channel-shaped optical waveguide layer patterned in the desired shape may be used (referred to below as a channel optical waveguide structure). Such a channel optical waveguide structure may be a structure of a slab optical waveguide layer and a channel-shaped optical waveguide layer, or it may be a structure just of a channel-shaped optical waveguide layer.

Preferable specific examples that can be given of channel optical waveguide structures include: channel optical waveguide structures in which a protrusion is provided on an optical waveguide layer; channel optical waveguide structures in which a cladding layer is provided after providing a protrusion on an optical waveguide layer; and channel optical waveguide structures in which a recess is made in a buffer layer and then an optical waveguide layer is provided. Such structures may easily be obtained by film lamination layers, for example, providing an epitaxial or single orientation buffer layer, and providing on this an epitaxial optical waveguide layer with a refractive index greater than that of the buffer layer.

Next, the buffer layer will be explained. The buffer layer may be formed with materials having a smaller refractive index than that of the optical waveguide layer material. Also, it is preferable that the buffer layer is able to maintain an epitaxial relationship to the substrate material and the optical waveguide layer material. The conditions for maintaining such an epitaxial relationship may be that the crystal structure of the buffer layer material should be similar to that of the substrate material and that of the optical waveguide layer material. It is preferable that the difference in lattice constants is 10% or less, however, as long as such an epitaxial relationship may be maintained then this numerical relationship does not necessarily need to be fulfilled. Specific examples of buffer layer materials are, for example, selected from PLZT, or $SrTiO_3$, $BaTiO_3$, $(Sr_{1-x}Ba_x)TiO_3$ (0<x<1.0), $KNbO_3$ and the like.

Next, the cladding layer will be explained. The cladding layer may be formed with materials having a smaller refractive index than that of the optical waveguide layer material. Also, it is not always necessary for the cladding layer to be able to maintain an epitaxial relationship to the optical waveguide layer, and a multi-crystal film or amorphous substance is also suitable. Specific examples of cladding layer materials may, for example, be selected from PLZT, or $SrTiO_3$, $BaTiO_3$, $(Sr_{1-x}Ba_x)TiO_3$, $Pb(Mg_{1/3}Nb_{2/3})O_3$, $KNbO_3$, $SiO_2$, $Al_2O_2$, $TaO_2$, polymers and the like.

Here, when the buffer layer and or the cladding layer are configured to include PLZT then rare earth elements may be contained therein. Furthermore, the optical waveguide layer, buffer layer, cladding layer may be configured to include compositions of PLZT that are different from each other. By changing the proportion of a rare earth element added to the PLZT compositions, that is to say Pb, La, Zr, and Ti, as well as the proportion of the PLZT compositions, the refractive index can be changed by a large amount, and PLZT may be used for various layer materials.

Next, explanation will be given of the fabrication method of the optical amplifier of the present invention. The optical amplifier of the present invention may be obtained by processing including at least: amorphization, forming an amorphous film as a precursor for an optical waveguide layer; and crystallization, heating the amorphous film to crystallize to form an optical waveguide layer by solid-phase epitaxial growth.

Specifically, the optical waveguide layer may be formed by: forming an amorphous film as a precursor for an optical waveguide layer using a wet process such as a sol gel method, a metalorganic deposition (MOD) method, or the like (amorphization); then heating the amorphous film to crystallize to form the optical waveguide layer by solid-phase epitaxial growth using a solid-phase growth method (crystallization). Forming the optical waveguide layer by solid-phase epitaxial growth, in addition to enabling doping with a high concentration of a rare earth element, as described above, is also preferable from the point of view of the quality of the waveguide and waveguide patterning. The buffer layer and the cladding layer may also be formed in a similar manner.

The facility costs for carrying out amorphization by coating an optical waveguide layer precursor solution of an organometallic compound, of a metal alkoxide or organometallic salt or the like, onto a substrate by wet processes such as sol gel methods, MOD methods and the like and heating, and carrying out solid-phase epitaxial growth by crystallization by heating, are lower compared to the costs of various vapor phase forming methods. Also, not only with the method is there good uniformity within the plane of the substrate, but also, by simply formulating the compositions of the organometallic compound precursor according to the composition of films having the necessary refractive indices of the buffer layer, the optical waveguide layer, and the cladding layer, easy control may be made of these refractive indices that are important for structural control of the buffer layer, the optical waveguide layer and the cladding layer. Also good reproducibility is possible, and growth of buffer layers, optical waveguide layers and cladding layers with low optical transmission loss is possible, and furthermore, because rare earth element doping with uniformity at the atomic level and without formation of clusters is possible, this method is extremely effective.

The organometallic compounds used in the above wet processes may be selected from metal alkoxides and metal salts, which are the reaction products of various metals (including rare earth elements) and organic compounds (preferably organic compounds with boiling points of 80° C. or above), however, there is no limitation to such. As organic ligands for the organometallic compounds $R_1O$— or $R_2OR_3O$— may be selected (wherein $R_1$ and $R_2$ represent aliphatic hydrocarbon groups, and $R_3$ represents a divalent aliphatic hydrocarbon group that may have an ester bond).

Metals and organic compounds that are the raw materials may be reacted with a solvent of a particular composition selected from alcohols, diketones, ketonic acid, alkyl esters, oxyacids, oxyketones, acetic acid and the like (preferably a solvent with a boiling point of 80° C. or above), or dissolved in a solvent, and then coated onto a single crystal substrate. Organometallic compounds may also be coated after hydrolyzing, but in order to obtain a solid-phase epitaxial film with good characteristics it is better not to hydrolyze. Also, from the perspective of the quality of the film obtained, these reactions are preferably carried in a dry nitrogen or argon atmosphere.

Metal alkoxide compounds contain a metal and may be synthesized by carrying out distillation and refluxing of an organic solvent represented by $R_1OH$ or $R_2OR_3OH$. $R_1$ and $R_2$ represent aliphatic hydrocarbon groups, and alkyl groups with 1 to 4 carbon atoms are preferable as $R_1$ and $R_2$, and $R_3$ represents an alkylene group of 2 to 4 carbon atoms, and the alkylene group of 2 to 4 carbon atoms is preferably a divalent group that is bonded with an ester bond such that there are 4 to 8 carbon atoms in total.

For solvents with a boiling point of 80° C. or more, specific examples are solvents which easily carry out an alcohol exchange reaction with the metal alkoxide, for example, alcohols such as $(CH_3)_2CHOH$ (boiling point 82.3° C.), $CH_3(C_2H_5)CHOH$ (boiling point 99.5° C.), $(CH_3)_2CHCH_2OH$ (boiling point 108° C.), $C_4H_9OH$ (boiling point 117.7° C.), $(CH_3)_2CHC_2H_4OH$ (boiling point 130.5° C.), $CH_3OCH_2CH_2OH$ (boiling point 124.5° C.), $C_2H_5OCH_2CH_2OH$ (boiling point 135° C.), $C_4H_9OCH_2CH_2OH$ (boiling point 171° C.) and the like, are the most preferable, but the solvent is not limited to these, and $C_2H_5OH$ (boiling point 78.3° C.) and the like may be used.

Such solvents containing the organometallic compound may be coated on the substrate with a method selected from spin coating methods, dipping methods, spray methods, screen printing methods, and ink jet methods. From the perspective of the quality of the obtained film, it is preferable that the coating is carried out in a dry nitrogen or argon atmosphere.

After coating the solvent containing the organometallic compound, processing in an oxygen containing atmosphere (preferably in oxygen) may be carried out, as required, by heating the substrate within the temperature range in which crystallization does not occur of 100° C. to 500° C. (preferably 200° C. to 400° C.), raising the temperature at an increase in temperature rate of 0.1 to 1000° C. per second (preferably at an increase in temperature rate of 1 to 100° C. per second), thereby forming the amorphous film by thermal decomposition of the coating layer.

In addition, solid-phase epitaxial growth of the amorphous film is caused from the surface of the substrate by heating in an oxygen containing atmosphere (preferably in oxygen) within the temperature range of 500° C. to 1200° C. (preferably 600° C. to 900° C.), raising the temperature at an increase in temperature rate of 1 to 500° C. per second (preferably at an increase in temperature rate of 10 to 100° C. per second). In such crystallization, heating is carried out in the above temperature range for from 1 second to 24 hours, preferably from 1 second to 2 hours. Also, from the perspective of the quality of the film obtained, it is preferable for the oxygen atmosphere to use an oxygen atmosphere that has been dried for a certain amount of time, however, humidification of the atmosphere may also be carried out.

The thickness of a film formed by carrying out solid-phase epitaxial growth one time is between 10 nm and 1000 nm, and is preferably between 10 nm and 200 nm. By repeatedly carrying out the above solid-phase epitaxial growth it is possible to obtain a film of the desired thickness. Here, when solid-phase epitaxial growth is carried out repeatedly, it is preferable to carry out cooling at a cooling rate of 0.01 to 100° C. per second.

In the fabrication method of the optical amplifier of the present invention, when the optical waveguide layer has a channel-shaped optical waveguide layer, then etching may be carried out of at least one portion of the amorphous film or of the optical waveguide layer, forming the channel-shaped optical waveguide layer.

When forming a channel-shaped optical waveguide layer by etching in the amorphous film condition, crystallizing and causing solid-phase epitaxial growth, extremely smooth edges, side walls and surfaces, with very little optical loss by scattering, may be obtained. Also, by such a solid-phase epitaxial growth method, not only is there good uniformity within the plane of the substrate, compared to various vapor phase growth methods, but also there is the advantages that the refractive index of the film may be easily controlled, by the composition of the organometallic compound precursor, and good reproducibility may be achieved.

When forming a channel-shaped optical waveguide layer by crystallization of the amorphous film and causing solid-phase epitaxial growth, an optical waveguide layer with excellent crystallinity may be obtained.

Here, for etching of the amorphous film or the optical waveguide layer, for example, after coating the surface with a photoresist or electron beam resist, patterning can be made by carrying out sequentially light exposure, developing, etching, and removal of the resist.

The etching method may be: wet etching, by aqueous solutions of $HCl$, $HNO_3$, $HF$, $H_2SO_4$, $H_3PO_4$, $C_2H_2O_2$, $NH_4F$ and the like, or mixtures thereof; or dry etching such as by reactive ion etching by gases such as $Cl_2$, $CCl_4$, $CCl_2F_2$, $SF_6$, $CHF_3$, $CF$, $CHClFCF_3$, and mixtures of these gases with $O_2$, ICP etching, or ion beam etching and the like.

The optical amplifier of the present invention may be fabricated as described above.

EXAMPLES

The present invention will be explained below by way of examples. However, these various examples do not limit the present invention.

Example 1

Figure 9:
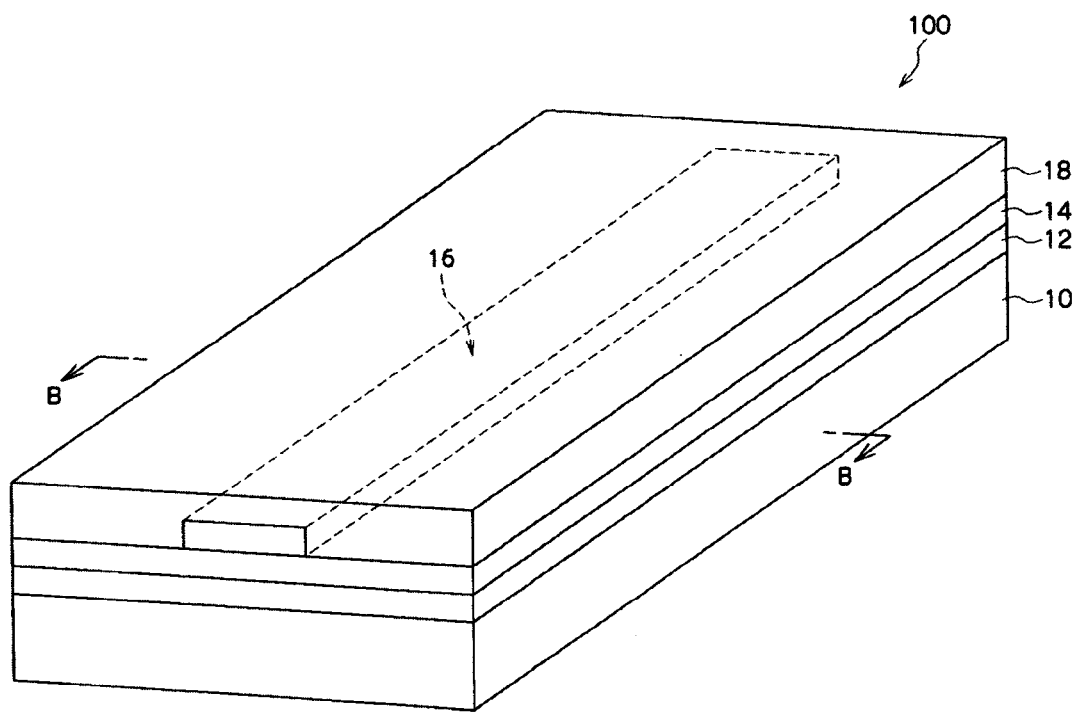
FIG. 9 is an outline perspective view of an example of an optical amplifier obtained in Example 1.

In the present example, as will be described below, an optical amplifier using a rib optical waveguide layer as shown in FIG. 9 and FIG. 10 was produced. The optical amplifier 100, as shown in FIG. 9 and FIG. 10, is provided sequentially with a buffer layer 12, a slab optical waveguide layer 14, and a channel-shaped optical waveguide layer 16, in that order, on a substrate 10. Furthermore, a cladding layer 18 is provided so as to cover the slab optical waveguide layer 14 and the channel-shaped optical waveguide layer 16.

First, 2-methoxyethanol ($CH_3OCH_2CH_2OH$:MOE) was added to $Pb(CH_3COO)_2$, and an alcohol exchange reaction was carried out by reflux heating. Then vacuum distillation was carried out, and removal of byproduct 2-methoxyethyl acetate was promoted. Next, an MOE solution of La (O-i-$C_3H_7$)$_3$, Zr(O-i-$C_3H_7$)$_4$, Ti(O-i-$C_3H_7$)$_4$ was added and an alcohol exchange reaction was carried out by reflux heating. Then vacuum distillation was carried out, and removal of by product 2-methoxyethyl acetate was promoted. A precursor solution was prepared by solvent elimination from the obtained product, re-adding MOE and adjusting the precursor concentration.

The obtained precursor solution was spin coated onto a Nb-doped $SrTiO_3$ (100) wafer (substrate 10) then, after amorphizing, crystallization and solid-phase epitaxial growth was carried out a number of times in a RTA (Rapid Thermal Annealing) furnace, and an epitaxial $Pb_{1-x}La_x(Zr_yTi_{1-y})_{1-x/4}O_3$ (x=0.04, y=0.78) buffer layer 12 was formed at a thickness of 2.3 µm.

Next, in the same way, an MOE precursor solution synthesized from $Pb(CH_3COO)_2$, Zr(O-i-$C_3H_7$)$_4$, Ti(O-i-$C_3H_7$)$_4$, and Er(O-i-$C_3H_7$)$_3$ was spin coated on the buffer layer 12, and, after amorphization, crystallization and solid-phase epitaxial growth was carried out a number of times in a RTA furnace, and an epitaxial Er 1.0 mol %: $Pb(Zr_yTi_{1-y})_{1-x/4}O_3$ (x=0, y=0.52) slab optical waveguide layer 14 was formed at a thickness of 2.4 µm. Then ICP etching was carried out on the slab optical waveguide layer 14 (Er-doped PZT optical waveguide layer) to a depth of 1.2 µm, and a width of 2.8 µm, and a straight line rib channel-shaped optical waveguide layer 16 was formed.

Further, a 1.0 µm thick $SiO_2$ cladding layer 18 was formed by sputtering so as to cover the slab optical waveguide layer 14 and the channel-shaped optical waveguide layer 16.

Then, after dicing the wafer, the light input and output end faces were polished, and an optical amplifier chip of length 2 cm was completed.

A laser beam having a wavelength of 1.55 µm as a signal beam, and a laser beam having a wavelength of 1.48 µm as a pump beam were introduced into the chip core, and in response to pump beam power the 1.55 µm signal beam intensity was measured, and for a pump beam power of 60 mW a net gain of the 1.55 µm signal beam of 4 dB, or 2 dB/cm, was obtained.

Comparative Example 1

In Comparative Example 1, an optical amplifier was obtained in the same way as that of Example 1, apart from the following changes.

First a 2.3 µm film thickness $Pb_{1-x}La_x(Zr_yTi_{1-y})_{1-x/4}O_3$ (x=0.04, y=0.78) buffer layer 12 was solid-phase epitaxially grown on a Nb-doped $SrTiO_3$ (100) wafer (substrate 10), then a 2.3 µm thick Er 0.1 mol %: $Pb(Zr_yTi_{1-y})_{1-x/4}O_3$(x=0, y=0.52) slab optical waveguide layer 14 was epitaxially grown. Then ICP etching was carried out on the slab optical waveguide layer 14 (Er-doped PZT optical waveguide layer) to a depth of 1.2 µm, and a width of 2.8 µm, and a straight line rib channel-shaped optical waveguide layer 16 was formed, and a 1.0 µm $SiO_2$ cladding layer 18 was formed by sputtering.

After this, after dicing the wafer, the light input and output end faces were polished, and an optical amplifier chip of length 2 cm was completed. A laser beam having a wavelength of 1.55 µm as a signal beam, and a laser beam having a wavelength of 1.48 µm as a pump beam were introduced into the chip core, and in response to pump beam power the 1.55 µm signal intensity was measured, and for a pump beam power of 60 mW no net gain of the 1.55 µm signal beam was obtained.

Comparative Example 2

In Comparative Example 2, an optical amplifier was obtained in the same way as that of Example 1, apart from the following changes.

First a 2.3 µm film thickness $Pb_{1-x}La_x(Zr_yTi_{1-y})_{1-x/4}O_3$ (x=0.04, y=0.78) buffer layer 12 was solid-phase epitaxially grown on a Nb-doped $SrTiO_3$ (100) wafer (substrate 10), then a 2.3 µm thick Er 13.0 mol %: $Pb(Zr_yTi_{1-y})_{1-x/4}O_3$(x=0, y=0.52) slab optical waveguide layer 14 was solid-phase epitaxially grown. Then ICP etching was carried out on the slab optical waveguide layer 14 (Er-doped PZT optical waveguide layer) to a depth of 1.2 µm, and a width of 2.8 µm, and a straight line rib channel-shaped optical waveguide layer 16 was formed, and a 1.0 µm $SiO_2$ cladding layer 18 was formed by sputtering.

After this, after dicing the wafer, the light input and output end faces were polished, and an optical amplifier chip of length 2 cm was completed. A laser beam having a wavelength of 1.55 µm as a signal beam, and a laser beam having a wavelength of 1.48 μm as a pump beam were introduced into the chip core, and in response to pump beam power the 1.55 μm signal beam intensity was measured, and for a pump beam power of 60 mW no net gain of the 1.55 μm signal beam was obtained.

Comparative Example 3

In Comparative Example 3, an optical amplifier was obtained in the same way as that of Example 1, apart from the following changes.

First a 2.3 μm film thickness $Pb_{1-x}La_x(Zr_yTi_{1-y})_{1-x/4}O_3$ (target composition x=0.04, y=0.78) buffer layer 12 was epitaxially grown on a Nb-doped $SrTiO_3$ (100) wafer (substrate 10), then a 2.3 μm thick Er 1.0 mol %: $Pb(Zr_yTi_{1-y})_{1-x/4}O_3$ (target composition x=0, y=0.52) slab optical waveguide layer 14 was epitaxially grown by suputtering. Then ICP etching was carried out on the slab optical waveguide layer 14 (Er-doped PZT optical waveguide layer) to a depth of 1.2 μm, and a width of 2.8 μm, and a straight line rib channel-shaped optical waveguide layer 16 was formed, and a 1.0 μm $SiO_2$ cladding layer 18 was formed by sputtering.

After this, after dicing the wafer, the light input and output end faces were polished, and an optical amplifier chip of length 2 cm was completed. A laser beam having a wavelength of 1.55 μm as a signal beam, and a laser beam having a wavelength of 1.48 μm as a pump beam were introduced into the chip core, and in response to pump beam power the 1.55 μm signal beam intensity was measured, and for a pump beam power of 60 mW no net gain of the 1.55 μm signal was obtained.

Example 2

In Example 2, an optical amplifier was obtained in the same way as that of Example 1, apart from the following changes.

First a 2.4 μm film thickness $Pb_{1-x}La_x(Zr_yTi_{1-y})_{1-x/4}O_3$ (x=0.09, y=0.65) buffer layer 12 was solid-phase epitaxially grown on a Nb-doped $SrTiO_3$ (100) wafer (substrate 10), then a 2.8 μm thick Er 2.0 mol %: $Pb_{1-x}La_x(Zr_yTi_{1-y})_{1-x/4}O_3$ (x=0.03, y=0.52) slab optical waveguide layer 14 was solid-phase epitaxially grown. Then ICP etching was carried out on the slab optical waveguide layer 14 (Er-doped PZT optical waveguide layer) to a depth of 1.0 μm, and a width of 3.0 μm, and a straight line rib channel-shaped optical waveguide layer 16 was formed, and a 1.0 μm $SiO_2$ cladding layer 18 was formed by sputtering.

After this, after dicing the wafer, the light input and output end faces were polished, and an optical amplifier chip of length 2 cm was completed. A laser having a wavelength of 1.55 μm as a signal beam, and a laser beam having a wavelength of 1.48 μm as a pump beam were introduced into the chip core, and in response to pump beam power the 1.55 μm signal beam intensity was measured, and for a pump beam power of 60 mW a net gain of the 1.55 μm signal beam of 3 dB or 1.5 dB/cm was obtained.

Example 3

Figure 11:
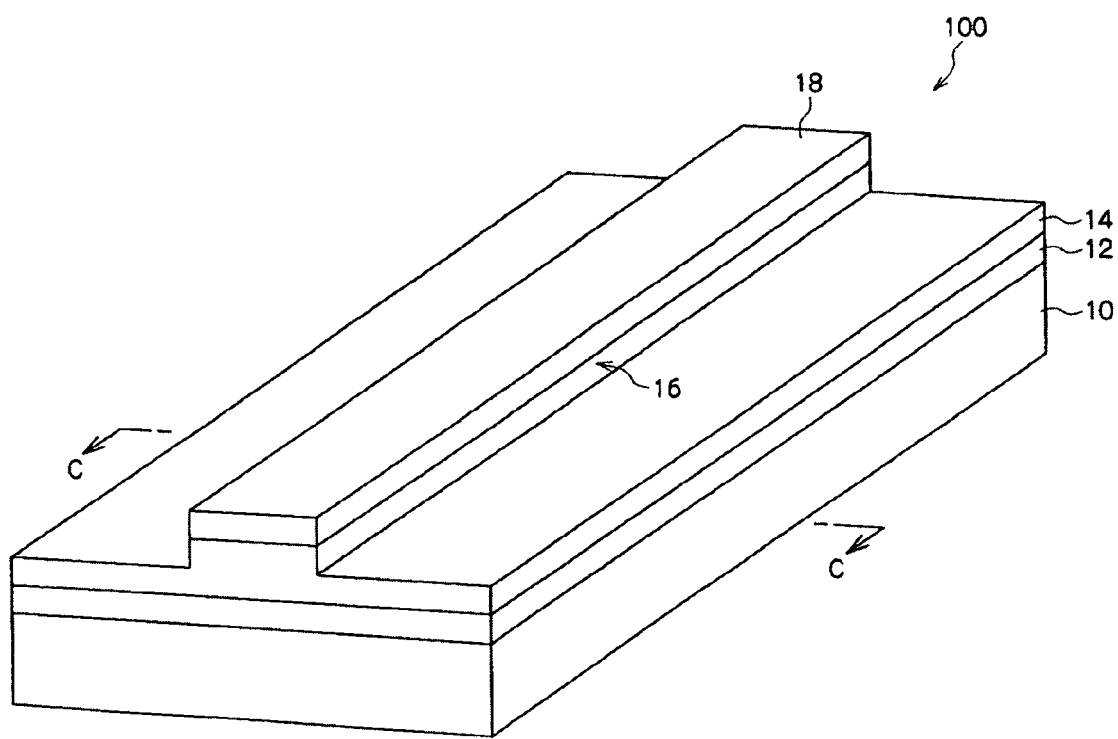
FIG. 11 is an outline perspective view of an example of an optical amplifier obtained in Example 3.
Figure 12:
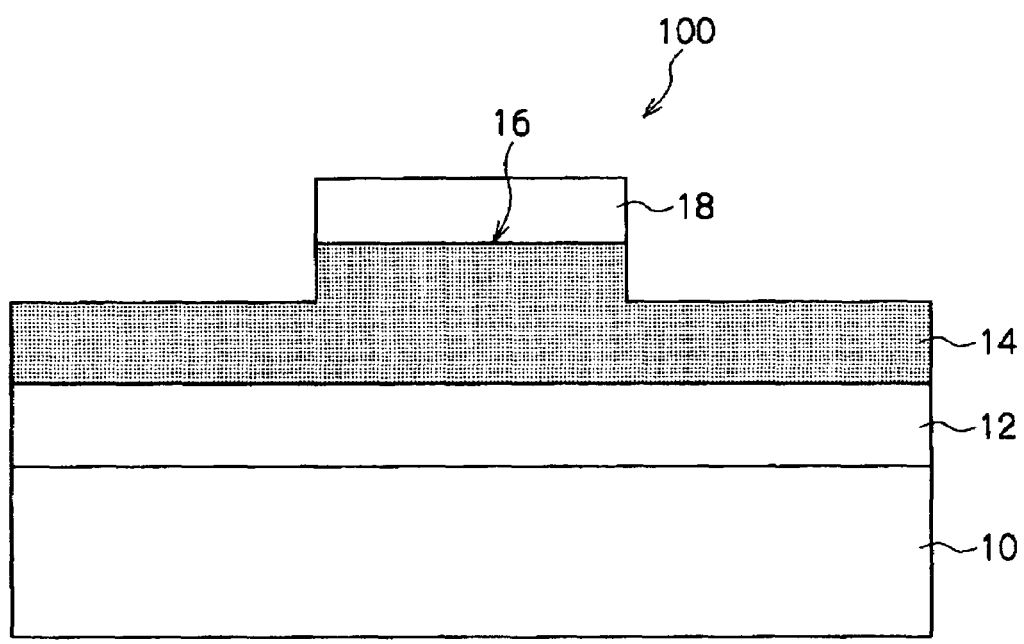
FIG. 12 is a cross-sectional diagram taken on C-C in FIG. 11.

In the present example, as will be described below, an optical amplifier using a rib optical waveguide layer as shown in FIG. 11 and FIG. 12 was produced. The optical amplifier 100, as shown in FIG. 11 and FIG. 12, is provided sequentially with a buffer layer 12, a slab optical waveguide layer 14, and a channel-shaped optical waveguide layer 16, in that order, on a substrate 10. Furthermore, a cladding layer 18 is provided so as to cover the channel-shaped optical waveguide layer 16.

Apart from changes in the composition, in the same manner as in Example 1, a 2.0 μm film thickness Er 3.0 mol %: $Pb_{1-x}La_x(Zr_yTi_{1-y})_{1-x/4}O_3$ (x=0.04, y=0.78) buffer layer 12 was solid-phase epitaxially grown on a Nb-doped $SrTiO_3$ (100) wafer (substrate 10), then a 2.0 μm thick Er 3.0 mol %: $Pb_{1-x}La_x(Zr_yTi_{1-y})_{1-x/4}O_3$ (x=0.06, y=0.61) slab optical waveguide layer 14 was epitaxially grown.

Further, a 1.0 μm thick $Pb_{1-x}La_x(Zr_yTi_{1-y})_{1-x/4}O_3$ (x=0.04, y=0.78) cladding layer 18 was solid-phase epitaxially grown, and ICP etching was carried out on the slab optical waveguide layer 14 to a depth of 1.7 μm, and a width of 2.8 μm, and a straight line rib channel-shaped optical waveguide layer 16 was formed. Here, etching was also performed on the cladding layer 18, and patterning was carried out.

Then, after dicing the wafer, the light input and output end faces were polished, and an optical amplifier chip of length 2 cm was completed. A laser beam having a wavelength of 1.55 μm as signal beam, and a laser beam having a wavelength of 1.48 μm as a pump beam were introduced into the chip core, and in response to pump beam power the 1.55 μm signal beam intensity was measured, and for a pump beam power of 60 mW a net gain of the 1.55 μm signal beam of 3 dB, or 1.5 dB/cm, was obtained.

Example 4

Figure 13:
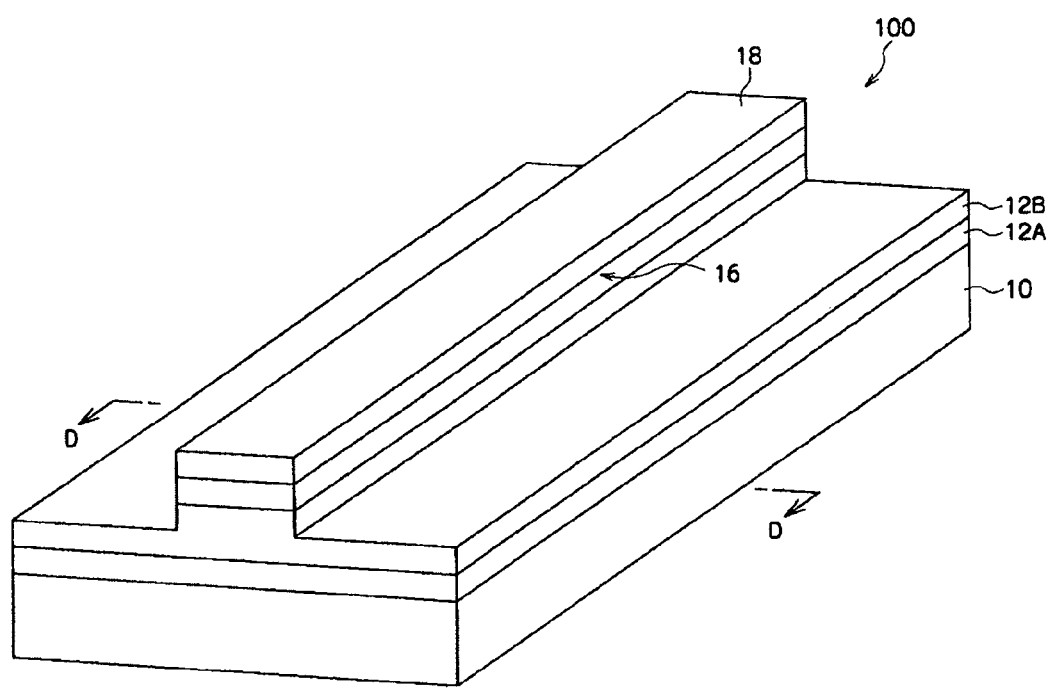
FIG. 13 is an outline perspective view of an example of an optical amplifier obtained in Example 4.
Figure 14:
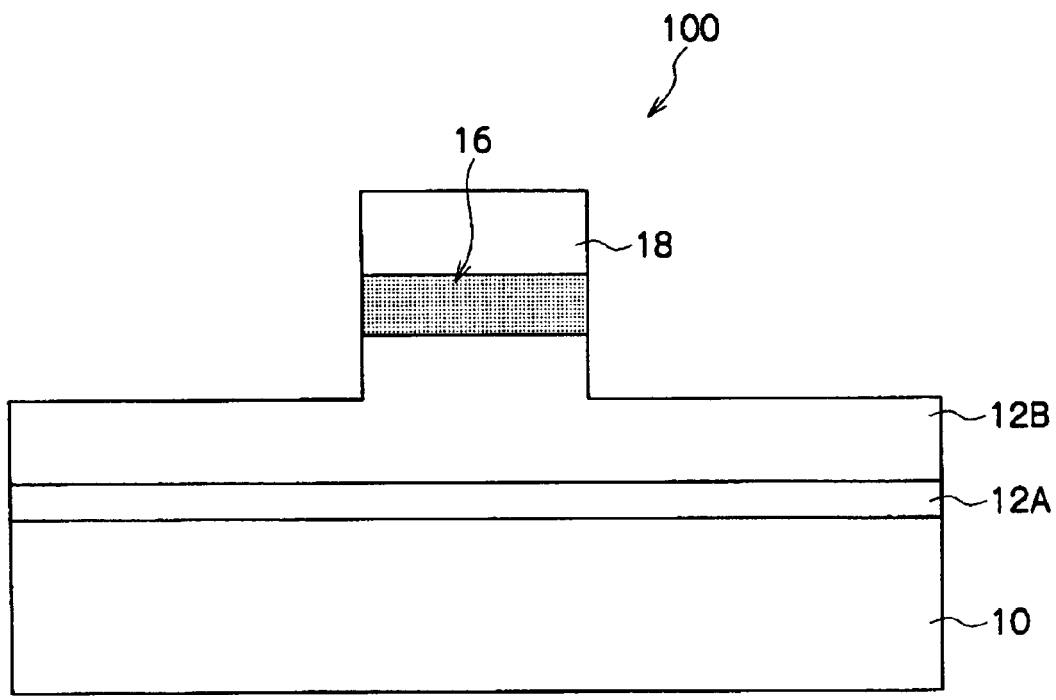
FIG. 14 is a cross-sectional diagram taken on D-D in FIG. 13.

In the present example, as will be described below, an optical amplifier using a rib optical waveguide layer as shown in FIG. 13 and FIG. 14 was produced. The optical amplifier 100, as shown in FIG. 13 and FIG. 14, is provided sequentially with a first buffer layer 12A, a second buffer layer 12B, and a channel-shaped optical waveguide layer 16, in that order, on a substrate 10. Furthermore, a cladding layer 18 is provided so as to cover the channel-shaped optical waveguide layer 16.

As the first buffer layer 12A, MgO was epitaxially grown on a Si wafer (substrate 10) using an ion beam sputtering method. Then, apart from changes in the composition, in the same manner as in Example 1, as a second buffer layer 12B a $Pb_{1-x}La_x(Zr_yTi_{1-y})_{1-x/4}O_3$ (x=0.04, y=0.78) was solid-phase epitaxially grown, then an Er 5.0 mol %: $Pb_{1-x}La_x(Zr_yTi_{1-y})_{1-x/4}O_3$ (x=0.06, y=0.61) slab optical waveguide layer was solid-phase epitaxially grown. Further, a $Pb_{1-x}La_x(Zr_yTi_{1-y})_{1-x/4}O_3$ (x=0.04, y=0.78) cladding layer 18 was solid-phase epitaxially grown.

ICP etching was carried out to a width of 2.8 μm, and a straight line rib channel-shaped optical waveguide layer 16 was formed. Here, etching was also performed on the buffer layer 12B and the cladding layer 18, and patterning was carried out.

Then, after dicing the wafer, the light input and output end faces were polished, and an optical amplifier chip of length 2 cm was completed. A laser beam having a wavelength of 1.55 μm as a signal beam, and a laser beam having a wavelength of 1.48 μm as a pump beam were introduced into the chip core, and in response to pump beam power the 1.55 μm signal beam intensity was measured, and efficient net gain was obtained.

Example 5

Figure 15:
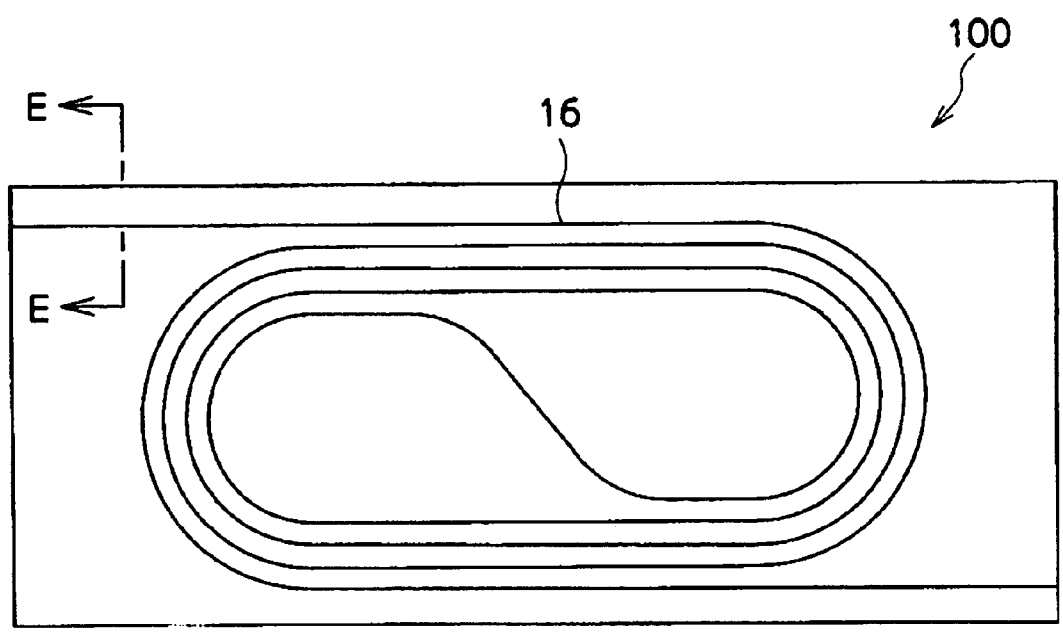
FIG. 15 is an outline perspective view of an example of an optical amplifier obtained in Example 5.
Figure 16:
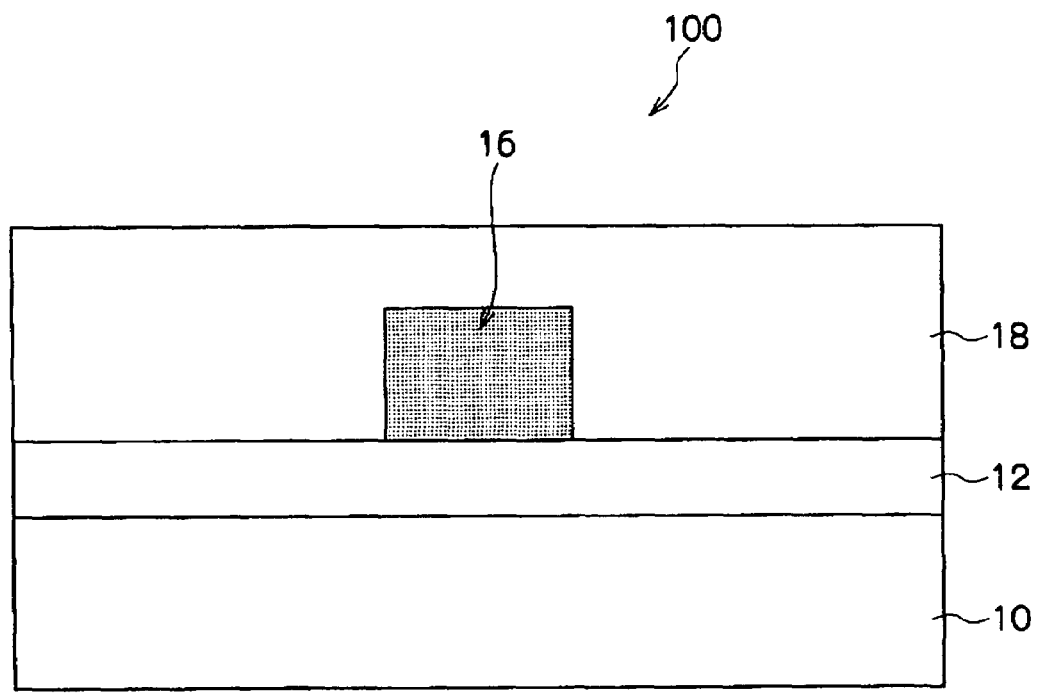
FIG. 16 is a cross-sectional diagram taken on E-E in FIG. 15.

In the present example, as will be described below, an optical amplifier using a rib optical waveguide layer as shown in FIG. 15 and FIG. 16 was produced. The optical amplifier 100, as shown in FIG. 15 and FIG. 16, is provided sequentially with a buffer layer 12, and a channel-shaped optical waveguide layer 16, in that order, on a substrate 10. Furthermore, a cladding layer 18 is provided so as to cover the channel-shaped optical waveguide layer 16.

Then, apart from changes in the composition, in the same manner as in Example 1, a $Pb_{1-x}La_x(Zr_yTi_{1-y})_{1-x/4}O_3$ (x=0.28, y=0) buffer layer 12 was solid-phase epitaxially grown on a sapphire wafer (substrate 10), then an Er 2.0 mol %: $Pb_{1-x}La_x(Zr_yTi_{1-y})_{1-x/4}O_3$(x=0.03, y=0.52) slab optical waveguide layer was solid-phase epitaxially grown.

Then ICP etching was performed on the slab optical waveguide layer (Er-doped PZT optical waveguide layer), an embedded channel-shaped optical waveguide layer 16 was formed, arranged in a curvilinear shape such that its total length was about 10 cm, and further a $SiO_2$ cladding layer 18 was formed by sputtering.

Then, after dicing the wafer, the light input and output end faces were polished, and an optical amplifier chip of length 2 cm was completed. A laser beam having a wavelength of 1.55 μm as a signal beam, and a laser beam having a wavelength of 1.48 μm as a pump beam were introduced into the chip core, and in response to pump beam power the 1.55 μm signal beam intensity was measured, and efficient net gain was obtained.

By the above, in the various examples above, is can be seen that the following may be obtained: integration of PLZT optical waveguide devices that have high speeds, low driving voltages, low power consumptions, and small size; miniaturization of optical amplifier units; and small, high efficiency optical amplifiers with rare earth element-added PLZT optical waveguides that are necessary for integration or unification of plural optical amplifier units, modulization of miniaturized high-specification integrations of various modulators, switches, wavedividers and the like.

Hereinafter, exemplary embodiments of the present invention will be listed. However, these embodiments do not limit the present invention.

[1] An optical amplifier comprising an optical waveguide layer comprising $Pb_{1-x}La_x(Zr_yTi_{1-y})_{1-x/4}O_3$(PLZT: 0<x<0.3, 0<y<1.0) doped with a rare earth element at an amount of 0.2 mol % to 11.0 mol %, the optical waveguide layer being formed as a single crystal film by solid-phase epitaxial growth.

[2] The optical amplifier according to [1] wherein the rare earth element is erbium.

[3] The optical amplifier according to [1] further comprising a buffer layer and a cladding layer, and wherein the optical waveguide layer, the buffer layer and the cladding layer each comprise a PLZT composition and the respective PLZT compositions are different from each other.

[4] The optical amplifier according to [1], wherein the optical waveguide layer comprises a channel-shaped optical waveguide layer.

[5] The optical amplifier according to [1], wherein the doping amount of the rare earth element is from 0.2 mol % to 7.0 mol %.

[6] The optical amplifier according to [1], wherein the rare earth element is erbium and the doping amount is from 0.2 mol % to 3.0 mol %.

[7] A fabrication method for the optical amplifier according to [1], the optical amplifier fabrication method comprising:

forming on a substrate an amorphous film as an optical waveguide layer precursor; and heating the amorphous film to crystallize the film to form the optical waveguide layer by solid-phase epitaxial growth.

[8] The optical amplifier fabrication method of [7], further comprising performing etching on at least one portion of the amorphous film or of the optical waveguide layer, to form a channel-shaped optical waveguide layer.

[9] The optical amplifier fabrication method of [7], wherein the forming of the amorphous film comprises coating an optical waveguide layer precursor solution onto the substrate, and heating.

According to the present invention is provided an optical amplifier with a rare earth element-added PLZT optical waveguide layer, the optical amplifier being of small scale and high efficiency, and a fabrication method thereof.

All publications, patent applications, and technical standards mentioned in this specification are herein incorporated by reference to the same extent as if each individual publication, patent application, or technical standard was specifically and individually indicated to be incorporated by reference.

What is claimed is:

1. An optical amplifier comprising an optical waveguide layer comprising $Pb_{1-x}La_x(Zr_yTi_{1-y})_{1-x/4}O_3$(PLZT: 0<x<0.3, 0<y<1.0) doped with a rare earth element at an amount of 0.2 mol % to 11.0 mol %, the optical waveguide layer being formed as a single crystal film by solid-phase epitaxial growth.

2. The optical amplifier according to claim 1 wherein the rare earth element is erbium.

3. The optical amplifier according to claim 1 further comprising a buffer layer and a cladding layer, and wherein the optical waveguide layer, the buffer layer and the cladding layer each comprise a PLZT composition and the respective PLZT compositions are different from each other.

4. The optical amplifier according to claim 1, wherein the optical waveguide layer comprises a channel-shaped optical waveguide layer.

5. The optical amplifier according to claim 1, wherein the doping amount of the rare earth element is from 0.2 mol % to 7.0 mol %.

6. The optical amplifier according to claim 1, wherein the rare earth element is erbium and the doping amount is from 0.2 mol % to 3.0 mol %.

7. A fabrication method for the optical amplifier according to claim 1, the optical amplifier fabrication method comprising:

forming on a substrate an amorphous film as an optical waveguide layer precursor; and heating the amorphous film to crystallize the film to form the optical waveguide layer by solid-phase epitaxial growth.

8. The optical amplifier fabrication method of claim 7, further comprising performing etching on at least one portion of the amorphous film or of the optical waveguide layer, to form a channel-shaped optical waveguide layer.

9. The optical amplifier fabrication method of claim 7, wherein the forming of the amorphous film comprises coating an optical waveguide layer precursor solution onto the substrate, and heating.

\* \* \* \* \*